United States Patent [19]

Belart

[11] 4,395,072

[45] Jul. 26, 1983

[54] VEHICULAR HYDRAULIC BRAKE SYSTEM

[75] Inventor: Juan Belart, Walldorf, Fed. Rep. of Germany

[73] Assignee: ITT Industries, Inc., New York, N.Y.

[21] Appl. No.: 289,015

[22] Filed: Jul. 31, 1981

[30] Foreign Application Priority Data

Sep. 13, 1980 [DE] Fed. Rep. of Germany ....... 3034628

[51] Int. Cl.³ .......................... B60T 8/02; B60T 13/14
[52] U.S. Cl. .................................... 303/114; 188/345; 303/92; 303/116; 303/119
[58] Field of Search ............... 303/114, 116, 117, 118, 303/119, 113, 92, 115, 6 R, 6 A, 10, 13, 2, 11, 12, 48, 49, 84 R, 84 A, 28–30, 40, 68–69, 61–63; 188/181 A, 151 A, 345, 357, 359, 360

[56] References Cited
U.S. PATENT DOCUMENTS 3,827,759 8/1974 Belart ................................. 303/114

FOREIGN PATENT DOCUMENTS 2060798 5/1981 United Kingdom ................ 303/119
2065810 7/1981 United Kingdom ................ 303/119
2083581 3/1982 United Kingdom ................ 303/114

Primary Examiner—Douglas C. Butler
Attorney, Agent, or Firm—John T. O'Halloran; Peter R. Ruzek

[57] ABSTRACT

A hydraulic braking system, particularly for motor vehicles equipped with anti-skid devices, includes a housing having at least one chamber accommodating a pressure control unit controlling the pressure of hydraulic fluid admitted into brake circuits leading to respective brake-operating cylinders. The pressure control unit includes an actuating piston which subdivides the chamber into an actuating compartment, a working compartment, a supply compartment therebetween which is sealed from the actuating compartment and communicates with the working compartment through a gap between the piston and the housing, and another compartment at the end of the piston remote from the working compartment. An auxiliary piston is accommodated in the last-mentioned compartment and subdivides the same into two spaces into one of which the auxiliary pressure is admitted at the same time that it is admitted into the supply compartment. A sealing ring extends across the gap and permits flow from the supply into the working compartment but not in the opposite direction. The piston has a passage through which the hydraulic fluid can flow between the working compartment and the other space which is connected to a reservoir, unless a valve member engages a seat surrounding the end of the passage that opens into the working compartment. The valve member carries a tappet extending through the passage and through a house in the auxiliary piston to abut an end wall of the housing. When the auxiliary source fails, the pressure in the actuating compartment compresses the fluid in the working compartment so that braking action is still assured. Two pressure-control units can be used side-by-side for separate operation of two brake circuits.

16 Claims, 3 Drawing Figures

VEHICULAR HYDRAULIC BRAKE SYSTEM

BACKGROUND OF THE INVENTION

The present invention relates to a hydraulic brake system with auxiliary energy assistance in general, and more particularly for use in automotive vehicles incorporating antiskid brake control devices.

There are already known hydraulic brake systems including a control piston and a valve device which are arranged between a master cylinder and several wheel cylinders, the control device supplying a pressure built up by pedal force in the master cylinder to the wheel brake operating cylinders in the event of failure of the auxiliary pressure.

One vehicular brake system of this type is known from German published patent application No. 22 02 998. Basically, this system comprises a master cylinder, a brake booster, and an actuating device. Inserted between a pressure source, the brake booster and the depressurized return reservoir are two valves which, on their part, correlate the pressure in the brake booster to the respective state of motion of the wheels. One of these valves which is designed as a multiple-way valve connects with an actuating cylinder. The pressure of the brake booster is supplied via this multiple-way valve to an annular chamber of the actuating cylinder and displaces an actuating piston in dependence upon the correlated pressure. The pressure built up in the actuating cylinder this way is fed to the wheel brakes. Another port of the actuating cylinder is in connection with the master cylinder.

When the auxiliary pressure supply is fully operative, the brake system operation is such that a braking pressure is built up in the actuating cylinder which is proportionate to the correlated pressure.

The master cylinder pressure is ineffective in this state of operation, since a corresponding valve in the actuating cylinder will be closed already after a slight movement of the actuating piston.

Upon failure of the auxiliary pressure, the actuating piston remains in its rest position in which this valve is open. The pressure built up in the master cylinder is supplied via the open valve to the wheel brakes.

It has to be regarded as a disadvantage of the device described that a separate actuating cylinder has to be provided for each wheel to be controlled and that there is a comparatively high consumption of auxiliary energy.

Furthermore, a brake system with an anti-skid control is known from German published patent application No. 24 43 545, wherein the wheel-cylinder pressure is built up via a sleeve seal of a master cylinder under failure-free operating conditions. This sleeve seal acts as a check valve inasmuch as its flow resistance is low, when the flow is directed from a hydraulic booster associated with the master cylinder to the wheel brake operating cylinders, and the sleeve seal accomplishes quick interruption of communication between the booster and the brake circuits connected to the master cylinder in the presence of danger of inversion of flow as a result of a failure of the auxiliary energy, for example. In the case of such failure, the sleeve seal travels across a compensating bore during the braking operation and thus renders development of pressure in the master cylinder and static actuation of the wheel brakes connected to the master cylinder possible.

In this device, it has to be regarded as a disadvantage that the sleeve seal is required to constantly travel across the compensating bore upon failure of the auxiliary pressure and is, therefore, subject to wear.

Besides, a brake system constructed in such a manner affords no possibility of detecting the functional reliability of the sleeve seal with the auxiliary energy supply intact. Only in the event of failure of the auxiliary energy is it possible to recognize a damage to the sleeve seal inasmuch as then no braking pressure can be produced by depression of the brake pedal. Obviously at this time it may be too late to do anything to deal with this problem.

In addition, it has to be considered to be a disadvantage of the described brake system that the edges of the sealing lips of the sleeve seal are drawn into the compensating bore under certain pressure conditions in the master cylinder and in the booster and the amount of wear is increased many times over.

SUMMARY OF THE INVENTION

Accordingly, it is a general object of the invention to avoid the disadvantages of the prior art.

More particularly, it is an object of the invention to devise a control arrangement for controlling the admission of presurized hydraulic fluid from a master cylinder and from an auxiliary source to brake circuits leading to respective brake-operating cylinders, which is not possessed of the disadvantages of the conventional control arrangements of this type.

A further object of the invention as so to design the arrangement of the type here under consideration as to have low energy consumption.

Still another object of the present invention is to develop an arrangement capable of simultaneously controlling several brakes, thus reducing the cost of the braking system.

It is yet another object of the invention to so construct the arrangement that mechanical load on a sealing element employed therein is reduced to a minimum, with attendant reduction of the possibility of development of leakage.

A concomitant object of the present invention is to provide a control arrangement of the above type in which the inoperatability of the above-mentioned sealing element can be detected even in the absence of failure of the auxiliary source.

In pursuance of these objects and others which will become apparent hereafter, one feature of the invention resides in a control arrangement for use in hydraulic braking systems, particularly of automotive vehicles equipped with anti-skid control devices, for controlling the admission of pressurized hydraulic fluid from a master cylinder and an auxiliary source into brake circuits leading to respective brake-operating cylinders, this control arrangement comprising a housing part having at least one internal surface bounding a chamber centered on an axis; and a control unit accommodated in the chamber and including an actuating piston axially movable in the chamber and subdividing the same into at least an actuating compartment hydraulically connected with the master cylinder and a working compartment hydraulically connected with at least one of the brake circuits in use; means on the actuating piston for at least partially bounding a communicating path open toward the auxiliary source in use and toward the working compartment; and means for preventing flow of the hydraulic fluid in the path when the pressure in the working compartment predominates and for permitting such flow when the pressure supplied from the auxiliary source predominates in use, including a deflectable sealing element carried by the actuating piston and extending into the path.

When the arrangement is constructed in the above manner, there is obtained an important advantage in that the number of the required actuating devices is reduced. Besides, the sealing element acting as a check valve is subject to loads which largely cause no wear.

In a particularly advantageous embodiment, the actuating piston includes an axial passage communicating with a return reservoir on the one hand, and adapated to be closed by a seat valve on the other hand. In a particularly simple design, the actuating piston itself is provided with a valve seat which cooperates with a movable valve closure member. For an easy adjustment of the valve clearance, it is advantageous according to a further development to provide the actuating device with a tappet connected to the valve closure member, which tappet projects through the passage of the actuating piston and bears against the opposite housing wall. If, in accordance with an additional advantageous feature, a sleeve seal is used as a check valve, a solution has been found which is advantageous in terms of incurred costs and which additionally meets the conditions for long useful life by virtue of the low amount of mechanical loads.

For the supply of pressure fluid during a controlled braking operation, it is expedient to arrange an annular supply compartment behind the sleeve seal and to admit pressurized fluid into this compartment in case of need so as to prevent exhaustion of pressurized fluid from the brake circuits.

In accordance with a further aspect of the present invention, the actuating piston is moved in abutment with an auxiliary piston in the release position of the brake and the auxiliary piston is subjected to pressure during the control operation. It is thus ensured that the actuating piston, does not force pressurized fluid back to the master cylinder, which would otherwise influence the position of the brake pedal. In a particularly simple design, the auxiliary piston includes an axial bore and the tappet of the valve closure member extends therethrough in a sealed relationship. This measure improves the guiding of the tappet considerably.

The control arrangement is so constructed that it is possible without difficulty to connect several of them in parallel when it is desired to actuate the wheel brakes independently of each other. When the actuating device is subjected to the auxiliary pressure via a pressure control valve controlled by the master cylinder pressure, it is assured that the auxiliary pressure will only be effective for opposing a reaction on the brake pedal in the presence of a sufficiently high master cylinder pressure. The pressure control valve may be advantageously designed as a slide valve, the basic component of which is a spring loaded floating piston adapted to be acted upon by a master cylinder pressure.

BRIEF DESCRIPTION OF THE DRAWINGS

Above-mentioned and other features and objects of this invention will become more apparent by reference to the following description taken in conjunction with the accompanying drawings, in which.

DETAILED DESCRIPTION OF THE PREFERRED EMBODIMENT

Figure 1:
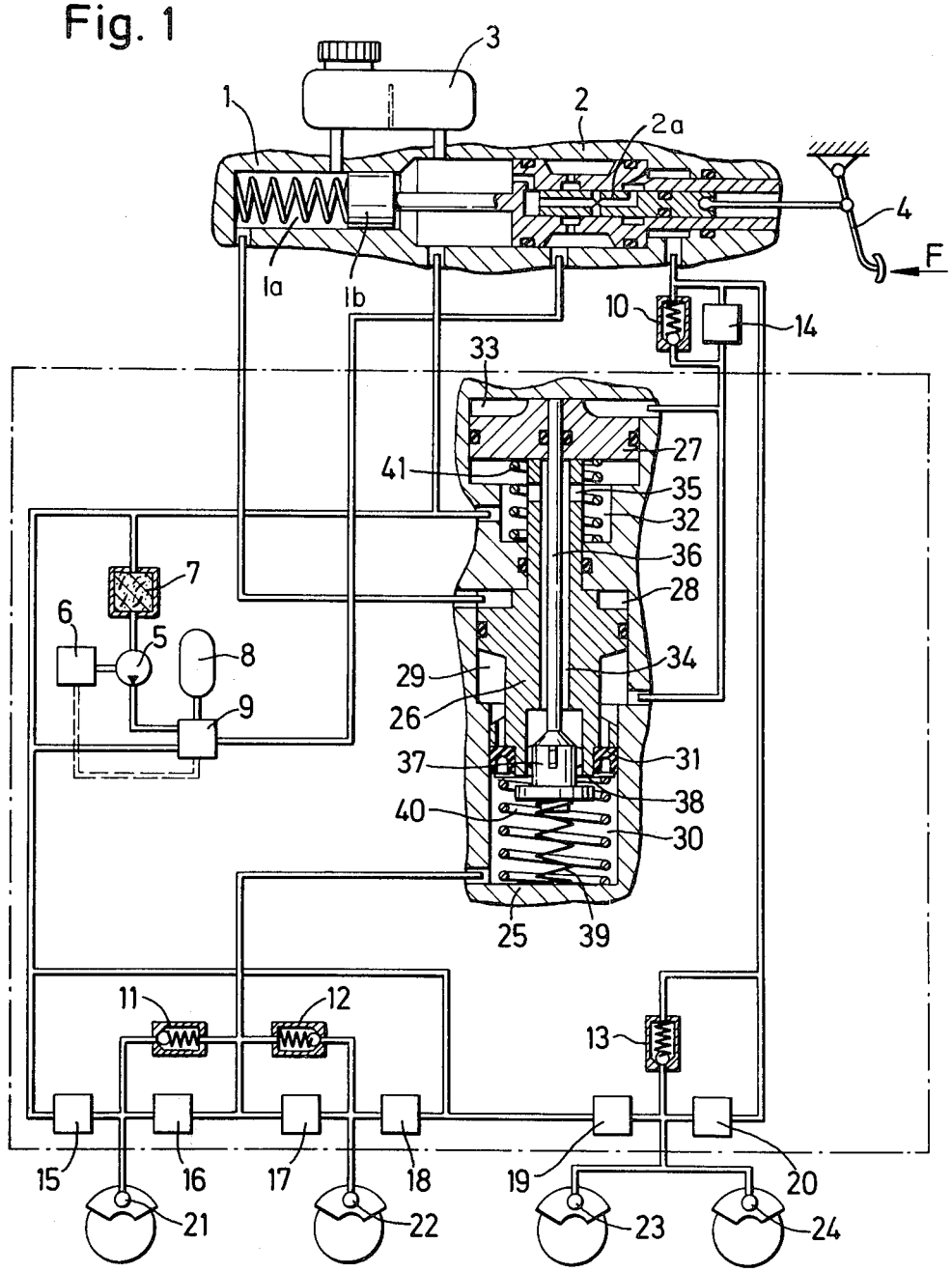
FIG. 1 is a cross-sectional view of a control arrangement of the present invention as used in a brake system incorporating a single master cylinder and a hydraulic booster.

Referring now to the drawings in detail, and first to FIG. 1, it may be seen that the reference numeral 1 identifies a master cylinder, the reference numeral 2 a hydraulic brake booster, and the reference numeral 3 a pressure fluid reservoir, which constitute a part of a hydraulic braking system which responds to changes in the position of a brake pedal 4. The braking system further comprises a pump 5, an electric motor 6, a filter 7, an accumulator 8 and an accumulator-charging valve 9 which together constitute an auxiliary pressure source. Other components of the brake system are check valves 10, 11, 12, 13, solenoid valves 14, 15, 16, 17, 18, 19, 20 and wheel brakes 21, 22, 23, 24.

The solenoid valves 16, 17, 20, are inlet valves whose flow-through cross-sections are opened in the de-energized state while the solenoid valves 14, 15, 18, 19 are designed as outlet valves opening their flow-through cross-sections exclusively in the event of electronic power supply to their solenoids.

Reference numeral 25 designates a housing of an actuating or pressure-control device accommodating an actuating piston 26 and an auxiliary piston 27. The actuating piston 26 is a stepped piston combining with parts of the housing 25 to form two annular chambers 28, 29. In use, the annular actuating chamber 28 is in communication with a working chamber 1a of the master cylinder 1 via a pressure line. Auxiliary pressure is permitted to be introduced in the annular supply chamber 29 via the outlet valve 14, connected in parallel to which is the check valve 10, and via a slide valve 2a of the brake booster 2. A sleeve seal 31 surrounding a part of the actuating piston 26 is interposed between the annular chamber 29 and a working chamber 30 communicating with the front wheel brakes 21, 22. The portion of the actuating piston 26 remote from the sleeve seal 31 will move in abutment with the auxiliary piston 27 in a relief compartment 32. Together with parts of the housing 25, the auxiliary piston 27 forms another annular chamber 33, which is, in turn, connected to the annular supply chamber 29.

The actuating piston 26 has an axial bore 34 and a radial bore 35 establishing a connection between the compartment 32 and the working chamber 30. The axial bore 34 of the actuating piston 26 accommodates a tappet 36 one end of which extends through the auxiliary piston 27 in a sealed relationship thereto and moves in abutment with the housing 25. The other end of the tappet 36 carries a valve closure member 37 which combines with a valve seat 38 shaped at the actuating piston 26 to form a fluid-return blocking arrangement 25 via a compression spring 39. Two more compression springs 40,41 are inserted to accomplish a defined rest position of the pistons 26,27.

The mode of operation of the vehicular brake system described will be explained in more detail in the following: As long as the auxiliary pressure source 5, 6, 7, 8, 9 is fully operative, a force F acting on the brake pedal 4 will open the slide valve 2a contained in the hydraulic brake booster 2 so that auxiliary pressure is fed to a booster chamber. Via the inlet valve 20, the auxiliary pressure is introduced directly to the wheel brakes 23, 24 of the rear axle and additionally causes a booster piston 26 to displace a piston 1b of the master cylinder 1 to the left, as considered in the drawing. A pressure develops in the annular actuating chamber 28 causing displacement of the actuating piston 26 against the force of the compression spring 40 by such a distance that the valve seat 38 of the actuating piston 26 engages the valve closure member 37 and return flow of pressure fluid from the working chamber 30 into the compartment 32 and thus to the pressure fluid reservoir 3 is closed. Further displacement of the actuating piston 26 will build up a pressure in the working chamber 30 which is fed to the wheel brakes 21, 22 of the front axle via the inlet valves 16, 17 and corresponding pressure lines.

As soon as an electronic control device which is conventional and thus not shown, detects a need for taking a corrective action, which arises when at least one wheel of the vehicle has been braked to such an extent that the danger of locking of the wheel is imminent, so that a pressure decrease is to be effected by removing pressurized fluid from brake operating cylinder the corresponding wheel, first the valve 14 is switched into its open position so that the annular chambers 29, 33 are subjected to the auxiliary pressure as present at the outlet of the valve 14. As a pressure decrease in the wheel brakes 21, 22 is brought about under these potentially skidding conditions by removing pressure fluid via the outlet valves 15, 18, an amount of the pressurized fluid equivalent to that so removed is supplied to the working chamber 30 past the sleeve seal 31, resulting in constant availability of pressurized fluid for further braking actions. At the same time, the auxiliary piston 27 moves in abutment with a stop of the housing 25 and maintains the actuating piston 26 in a defined position. It is avoided in this manner that the actuating piston 26 would be urged back to its rest position by the pressure in the annular supply chamber 29, which would reflect on the position of the brake pedal 4.

When the auxiliary pressure fails, the aforementioned electronic control device will be de-activated by the action of a corresponding control command signal issued in a conventional manner upon detection of such failure, causing the solenoid valves 14, 15, 16, 17, 18, 19, 20 to assume their de-energized off positions again. The outlet valves 15, 18, 19 which are now closed safely prevent further removal of the pressure fluid from the operating cylinders of the wheel brakes 21, 22, 23, 24. By depressing the brake pedal 4, pressure develops in the master cylinder 1 and is introduced via a pressure line into the annular chamber 28. The pressure in the annular chamber 28 exerts a force on the actuating piston 26 causing displacement of the latter in the brake-actuating direction. The fluid-return blocking arrangement formed by the valve closure member 37 and the valve seat 38 closes, causing development of a pressure in the working chamber 30 of the actuating device 25 which is supplied to the wheel brakes 21, 22, and ensures a sufficient vehicle deceleration.

Figure 2:
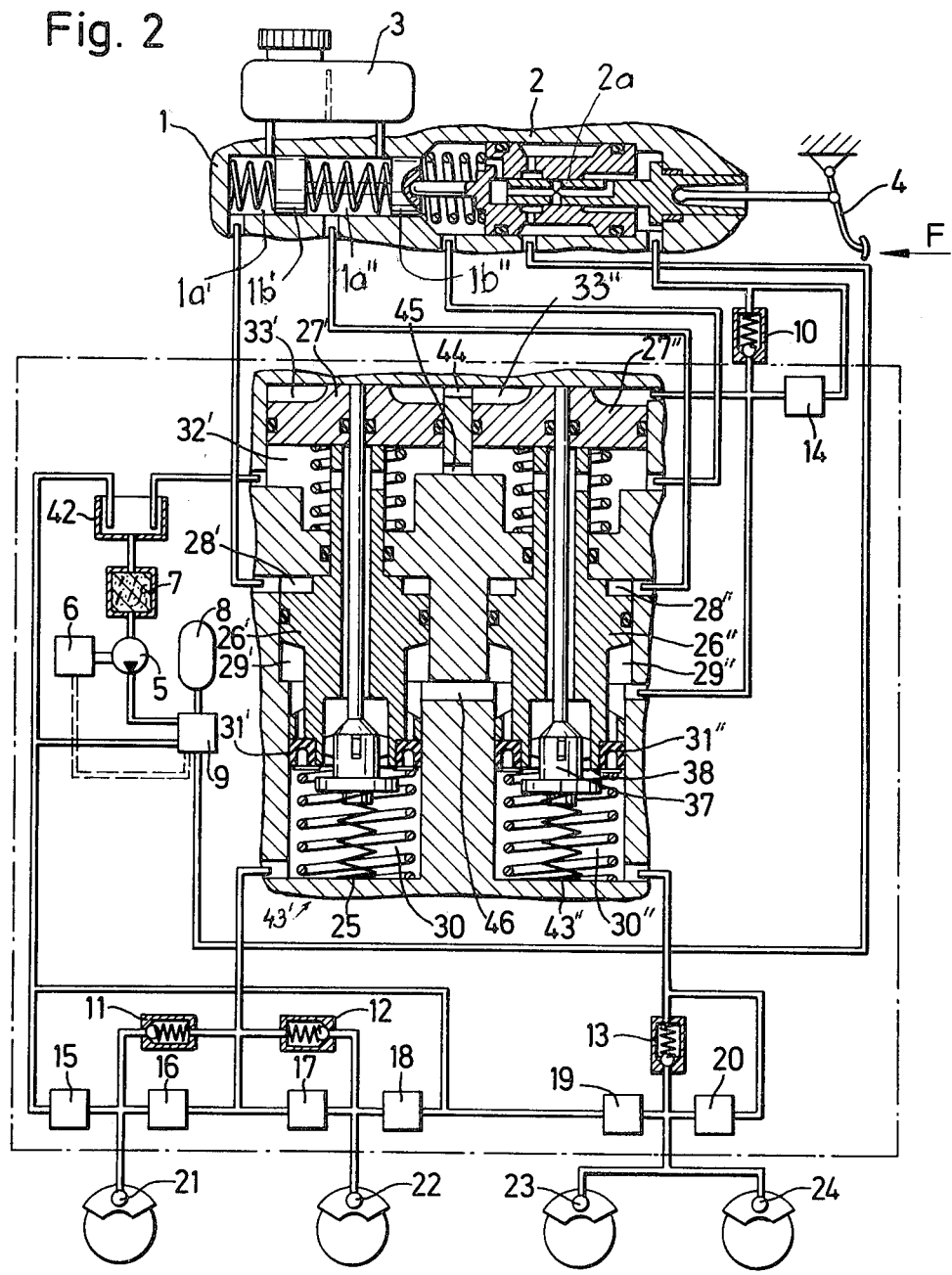
FIG. 2 is a view similar to FIG. 1 but of a control arrangement as used a brake system incorporating a tandem master cylinder and a hydraulic booster.
Figure 3:
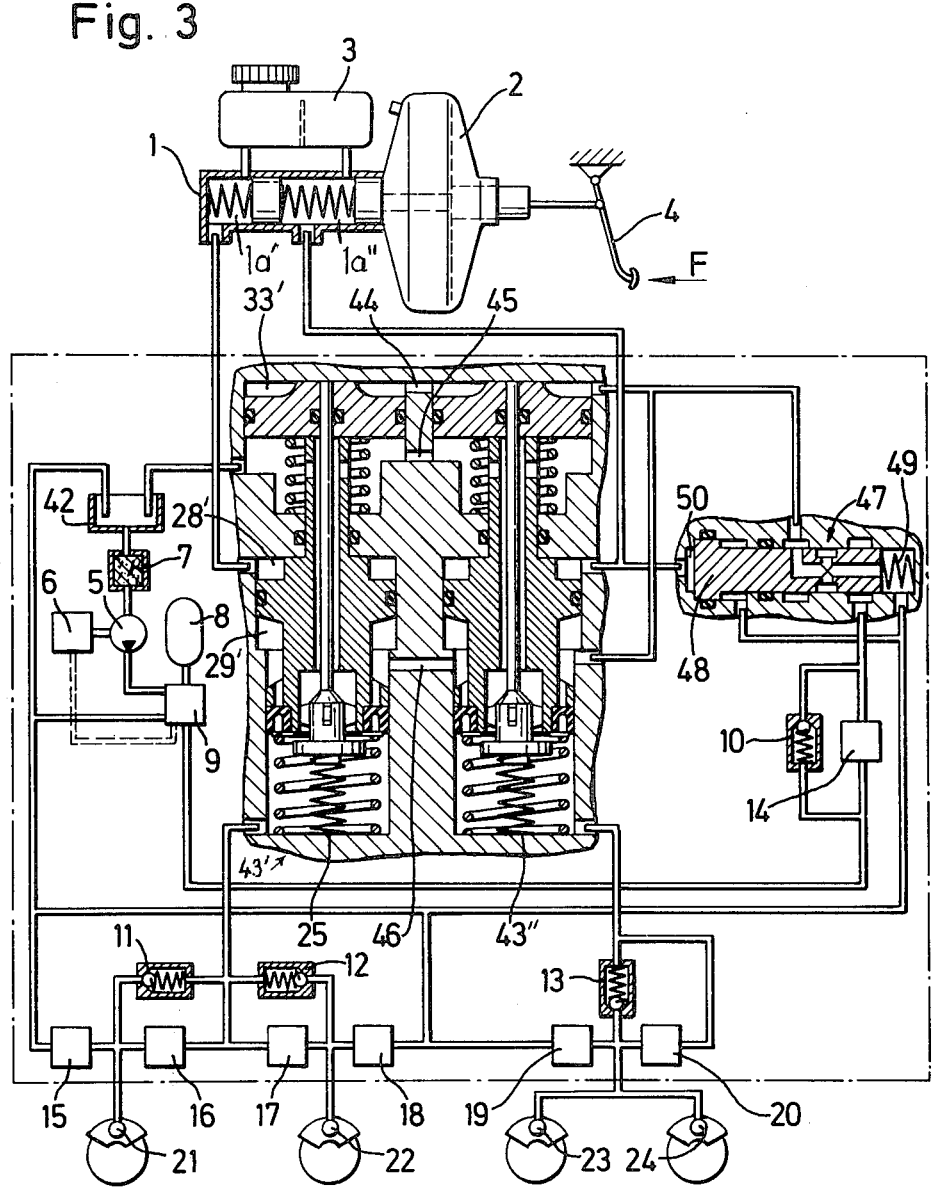
FIG. 3 is a view similar to FIGS. 1 and 2 but of a control arrangement as used in a brake system incorporating a tandem master cylinder and a vacuum booster.

Having so discussed the construction and operation of the braking system of FIG. 1, attention will now be turned to FIGS. 2 and 3 showing constructions which are similar to that discussed above, so that the same reference numerals, supplemented with primes and double primes, where appropriate, have been used to identify corresponding parts.

FIG. 2 shows a vehicular brake system with a tandem master cylinder 1. Moreover, this unit comprises a return reservoir 42, while the housing 25 accommodates two actuating or pressure-control devices 43', 43" identical with that discussed above, and has connecting channels 44, 45, 46. The two actuating devices 43', 43" are connected in parallel by the connecting channels 44, 45, 46 and each controls the brakes associated with one vehicle axle. Respective conduits connect two working chambers 1a' and 1a" of the tandem master cylinder 1 respectively to the annular chambers 28a and 28b'.

The mode of operation of this braking system will be explained in more detail in the following: in the event that the auxiliary energy supply is fully operational and during normal braking operation, pressure fluid is introduced from the accumulator 9 via the slide valve 2a of the brake booster 2 into the booster chamber, so that pressures which are proportionate to the force F applied on the brake pedal 4 will be built up in the master cylinder 1 by displacement of two master cylinder pistons 16', 16". These two pressures are fed via pressure lines to the annular chambers 28' or 28" of the actuating devices 43' or 43" and cause displacement of the respective actuating piston 26' or 26". After the closing of the fluid-return blocking arrangements 37, 38 of the respective devices 43', 43", a pressure build-up will take place in the working chambers 30' and 30". The pressure propagates via pressure lines and the inlet valves 16, 17, 20 to operating cylinders of the respective wheel brakes 21, 22, 23, 24. In this mode of operation, the annular chambers 29' and 29" of the actuating devices 43', 43" are depressurized; as a higher pressure prevails in the working chambers 30', 30", the sleeve seals 31' and 31" close and inhibit pressurized fluid flow from the working chambers 30', 30" into the annular chambers 29', 29". The annular chambers 32',32", 33',33" of the actuating devices 43', 43" are also depressurized.

If it becomes necessary during a control action to decrease the pressure in one or in several of the wheel brakes 21, 22, 23, 24 to prevent a locked condition of the respective wheel, the outlet valve 14 and one or several of the outlet valves 15, 18, 19 will open. The booster pressure is now fed via the opened outlet valve 14 into the annular chambers 33', 33" of the actuating devices 43', 43" on the one hand, and into the annular chambers 29', 29" on the other hand. Due to the fact that the annular chambers 33', 33" are subjected to pressure, a displacement of the auxiliary piston 27', 27" is commenced so that movement of the actuating piston 26 in the brake release direction is prevented, even though booster pressure introduced into the annular chambers 29', 29" exerts a force in this direction. Rather, presssurized fluid is fed from the annular chambers 29', 29" via the sleeve seals 31', 31" into the working chambers 30', 30" if pressure fluid has been discharged through the outlet valves 15, 18, 19. This measure serves to ensure a sufficient volume of pressure fluid being constantly available in the working chambers 30', 30" of the actuating devices 43', 43" during control action.

When the accumulator pressure fails or falls below an adjustable level, an electronic control device which is not shown because it is conventional will be de-activated so that all solenoid valves 14, 15, 16, 17, 18, 19, 20 will regain their de-energized positions. When braking in the event of failure of the auxiliary pressure, a brake actuation is guaranteed nevertheless as the pressure initiates again corresponding displacements of the actuating pistons 26', 26'' by the pressures supplied from the chambers 1a', 1a'' of the master cylinder 1 as a result of the action of the force F on the brake pedal 4, which displacements will cause an actuation of the wheel brakes 21, 22, 23, 24.

FIG. 3 shows a vehicular brake system with a vacuum brake booster 2, a tandem master cylinder 1 as well as two actuating devices 43', 43'' connected in parallel. Another component of the brake system is a pressure control valve 47 including a floating piston 48 designed as a slide valve. One end surface of the floating piston 48 is permanently subjected to the force of a compression spring 49. The other end surface of the floating piston 48 delimits a pressure chamber 50 communicating with a working chamber 1a'' of the tandem master cylinder 1 via connecting lines. In the embodiment illustrated, this is the working chamber 1a'' that actuates the brakes associated with the rear axle. The mode of operation of the brake system shown differs from the preceding explanations only in that the annular chambers 33', 29' of the actuating device 43' or the corresponding annular chambers of the actuating device 43'' can have the hydraulic fluid from the auxiliary source supplied thereto only when a master-cylinder pressure acts on the actuating device 43'' associated with the rear axle.

While I have described above the principles of my invention in connection with specific apparatus, it is to be clearly understood that this description is made only by way of example and not as a limitation to the scope of my invention as set forth in the accompanying claims.

I claim:

1. A control arrangement for use in hydraulic braking systems, particularly of automotive vehicles equipped with anti-skid control devices, for controlling the pressure of hydraulic fluid admitted into brake circuits leading to respective brake-operating cylinders in dependence on pressures developed in a master cylinder and an auxiliary source, comprising
   a housing part having at least one internal surface bounding a chamber centered on an axis; and
   a control unit accommodated in said chamber and including
   an actuating piston axially movable in said chamber and subdividing the same into at least an actuating compartment hydraulically connected with the master cylinder and a working compartment hydraulically connected with at least one of the brake circuits in use;
   means on said actuating piston for at least partially bounding a communicating path open toward the auxiliary source in use and toward said working compartment; and
   means for preventing flow of the hydraulic fluid in said path when the pressure in said working compartment predominates and for permitting such flow when the pressure supplied from the auxiliary source predominates in use, including a deflectable sealing element carried by said actuating piston and extending into said path.

2. The control arrangement as defined in claim 1, wherein said path has an annular cross-section; and wherein said sealing element is a sealing sleeve.

3. The control arrangement as defined in claim 1, wherein said bounding means includes a circumferential surface portion of said actuating piston which is radially inwardly spaced from said internal surface of said housing part to form therewith a gap constituting said path;

and wherein said sealing element is a sealing sleeve received in said gap.

4. The control arrangement as defined in claim 1, wherein said actuating piston and said internal surface together further delimit a supply compartment disposed between said actuating and working compartments and open toward the auxiliary source in use and toward said path.

5. The control arrangement as defined in claim 1, wherein said actuating piston further at least partially bounds a return for the hydraulic fluid; and wherein said control unit further includes means on said actuating piston for blocking said return path.

6. The control arrangement as defined in claim 5, wherein said control unit further includes a tappet rigid with said valve member, projecting into said passage, and bearing against said housing part.

7. The control arrangement as defined in claim 1, wherein said actuating piston has an axially extending return passage, and wherein said control unit further includes a valve seat surrounding one end of said passage, and a valve member movable relative to said valve seat and toward the latter in response to pressure increase in said actuating compartment to block the flow of the hydraulic fluid into said return passage.

8. The control arrangement as defined in claim 7; and further comprising means for maintaining said valve member at a distance from said valve seat in the absence of said pressure increase so as to define a clearance with said valve seat.

9. The control arrangement as defined in claim 1, wherein said actuating piston further at least partially bounds a return passage for the hydraulic fluid from said working compartment; and wherein said control unit further includes a valve seat surrounding that end of said return passage which opens into said working compartment, a valve member movable relative to said actuating piston toward and away from said valve seat, and spring means for urging said valve member toward said valve seat.

10. The control arrangement as defined in claim 9, wherein said control unit further includes a tappet rigid with said valve member, extending into said passage, and bearing against said housing part at least in the absence of pressure increase in said actuating compartment to oppose the action of said spring means.

11. The control arrangement as defined in claim 1, wherein said piston and said internal surface further delimit an auxiliary compartment; and wherein said control unit further includes an auxiliary piston accommodated in said auxiliary compartment and bearing against said actuating piston in the absence of pressure increase in said actuating compartment, said auxiliary piston subdividing said auxiliary compartment into two spaces one of which is open toward said auxiliary source.

12. The control arrangement as defined in claim 11, wherein said one space has an annular configuration.

13. The control arrangement as defined in claim 12, wherein said actuating piston has an axial return passage having one end open into said working compartment and another end open into said auxiliary compartment, and a valve seat surrounding said one end; wherein said control unit further includes a valve member movable relative to said actuating piston toward and away from said valve seat and having a tappet extending into said passage and beyond said other end thereof; and wherein said auxiliary piston has an axial bore for the passage of said tappet therethrough into contact with said housing part, and means for sealing said tappet in said bore.

14. The control arrangement as defined in claim 1 for use in a hydraulic braking system incorporating a tandem master cylinder having tandem chambers; further comprising another housing part defining an additional chamber, and an additional control unit similar to said control unit and accommodated in said additional chamber, each of the actuating compartments being open toward a different one of the tandem chambers, and each of said working compartments being open to a different brake circuit in use.

15. The control arrangement as defined in claim 1; and further comprising means for controlling the admission of the hydraulic fluid from the auxiliary source to said control unit in use, including a pressure control valve interposed between the auxiliary source and said control unit and acted upon by the master cylinder pressure.

16. The control arrangement as defined in claim 15, wherein said pressure control valve includes a valve housing having a bore, a valve slide received in said bore for axial sliding therein and acted upon by the master cylinder pressure in one axial direction, and a spring urging said valve slide in the other axial direction.

* * * * *